(12) United States Patent
Nagatani et al.

(10) Patent No.: US 8,130,866 B2
(45) Date of Patent: Mar. 6, 2012

(54) PEAK SUPPRESSING APPARATUS, PEAK SUPPRESSING METHOD, AND WIRELESS COMMUNICATION DEVICE

(75) Inventors: Kazuo Nagatani, Kawasaki (JP); Hajime Hamada, Kawasaki (JP); Hiroyoshi Ishikawa, Kawasaki (JP); Nobukazu Fudaba, Kawasaki (JP); Yuichi Utsunomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 12/411,553

(22) Filed: Mar. 26, 2009

(65) Prior Publication Data

US 2009/0318099 A1 Dec. 24, 2009

(30) Foreign Application Priority Data

Jun. 24, 2008 (JP) ................... 2008-164519

(51) Int. Cl.
*H04L 25/03* (2006.01)
*H04L 25/20* (2006.01)
(52) U.S. Cl. ...................... 375/297; 332/107
(58) Field of Classification Search .............. 375/285, 375/295, 296, 297; 332/106, 107, 117, 123, 332/124, 125, 159, 160
See application file for complete search history.

(56) References Cited

U.S. PATENT DOCUMENTS

| | | | | |
|---|---|---|---|---|
| 5,202,900 A | * | 4/1993 | Leitch | 375/278 |
| 5,287,387 A | * | 2/1994 | Birchler | 375/296 |
| 5,638,403 A | * | 6/1997 | Birchler et al. | 375/296 |
| 6,504,862 B1 | * | 1/2003 | Yang | 375/146 |
| 6,775,331 B1 | | 8/2004 | Shinde | |
| 7,013,161 B2 | * | 3/2006 | Morris | 455/522 |
| 7,095,798 B2 | * | 8/2006 | Hunton | 375/296 |
| 7,170,952 B2 | * | 1/2007 | Hunton | 375/296 |
| 7,756,216 B2 | * | 7/2010 | Ishikawa et al. | 375/296 |
| 7,839,949 B2 | * | 11/2010 | Hamada et al. | 375/296 |
| 2007/0195909 A1 | | 8/2007 | Ishikawa et al. | |
| 2007/0197210 A1 | | 8/2007 | Mosley et al. | |

FOREIGN PATENT DOCUMENTS

| | | |
|---|---|---|
| EP | 1 802 065 | 6/2007 |
| EP | 1 879 296 | 1/2008 |
| JP | 2001-86094 | 3/2001 |
| JP | 2004-320432 | 11/2004 |
| JP | 2007-251909 | 9/2007 |
| WO | 2006/072669 | 7/2006 |

OTHER PUBLICATIONS

European Search Report dated Dec. 2, 2009, from the corresponding European Application.

* cited by examiner

*Primary Examiner* — Tesfaldet Bocure
(74) *Attorney, Agent, or Firm* — Fujitsu Patent Center

(57) ABSTRACT

A peak suppressing apparatus includes an amplitude limiter that limits amplitude of the transmission signal with a predetermined threshold; a peak-suppressing-signal extracting unit that extracts a peak suppressing signal by subtracting the transmission signal before the amplitude limiting from the transmission signal amplitude-limited by the amplitude limiter; a filtering unit that performs filtering so that a frequency characteristic of the peak suppressing signal extracted by the peak-suppressing-signal extracting unit becomes flat; and an adder that adds the peak suppressing signal filtered by the filtering unit to the transmission signal.

5 Claims, 9 Drawing Sheets

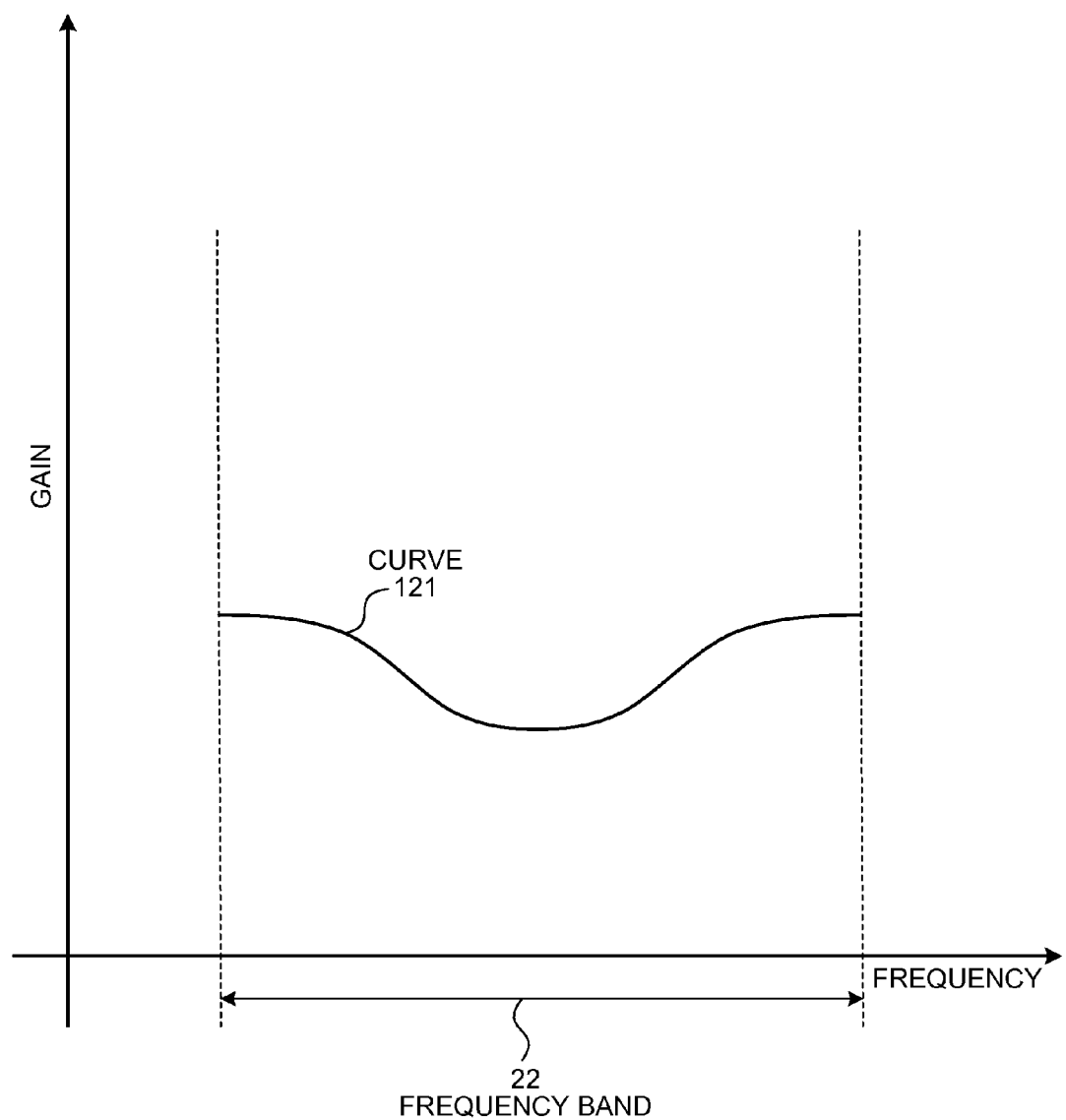

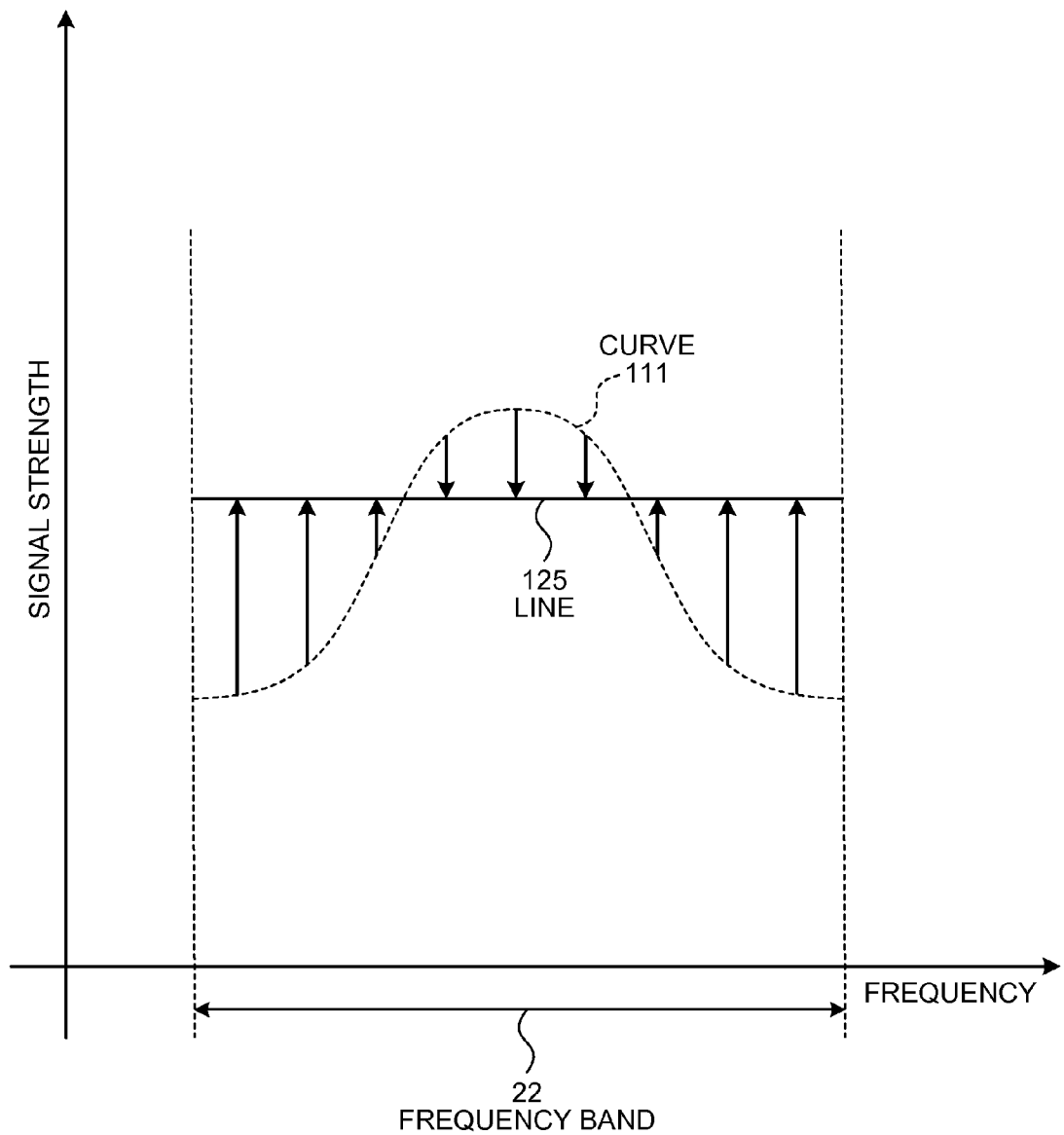

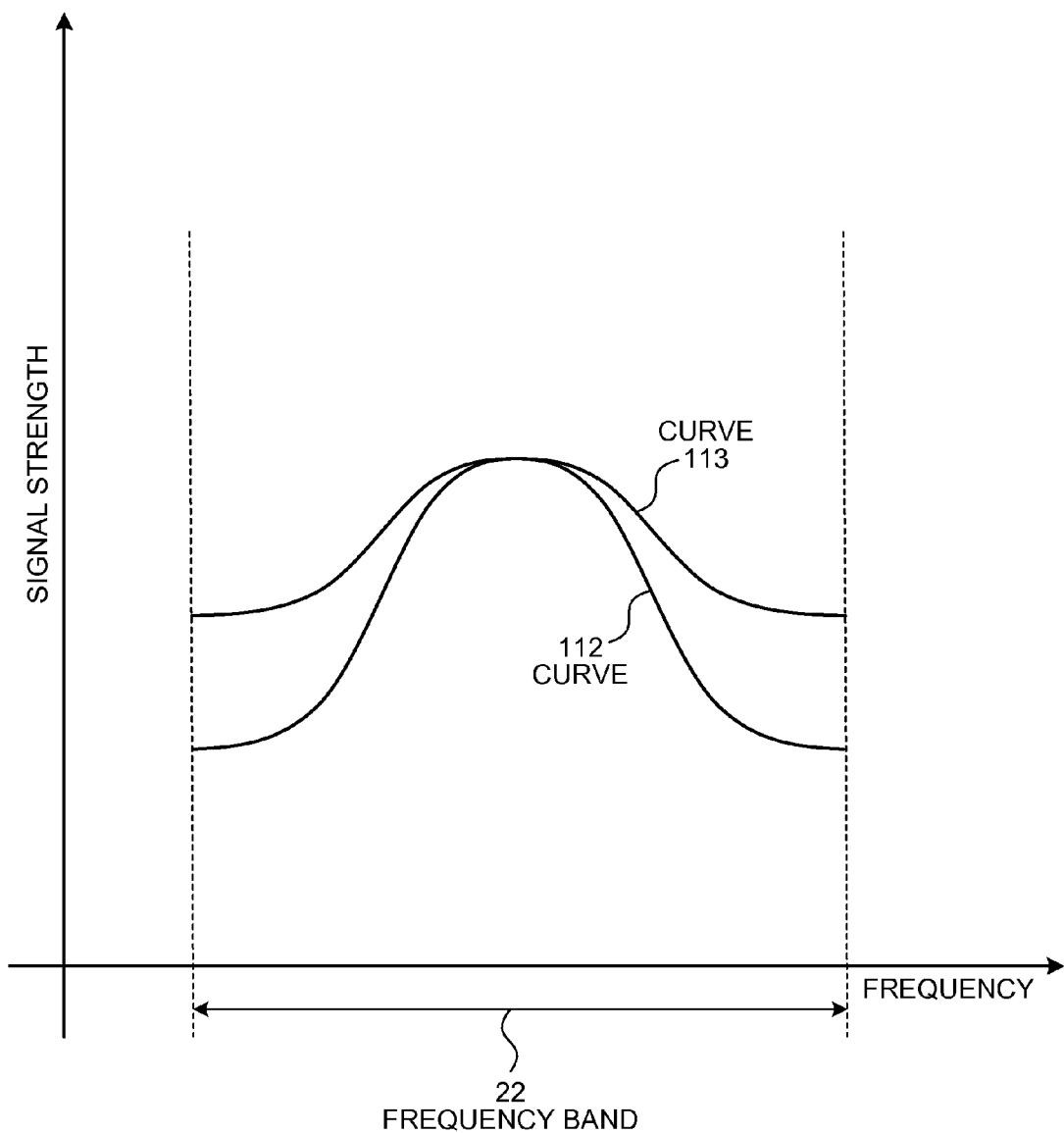

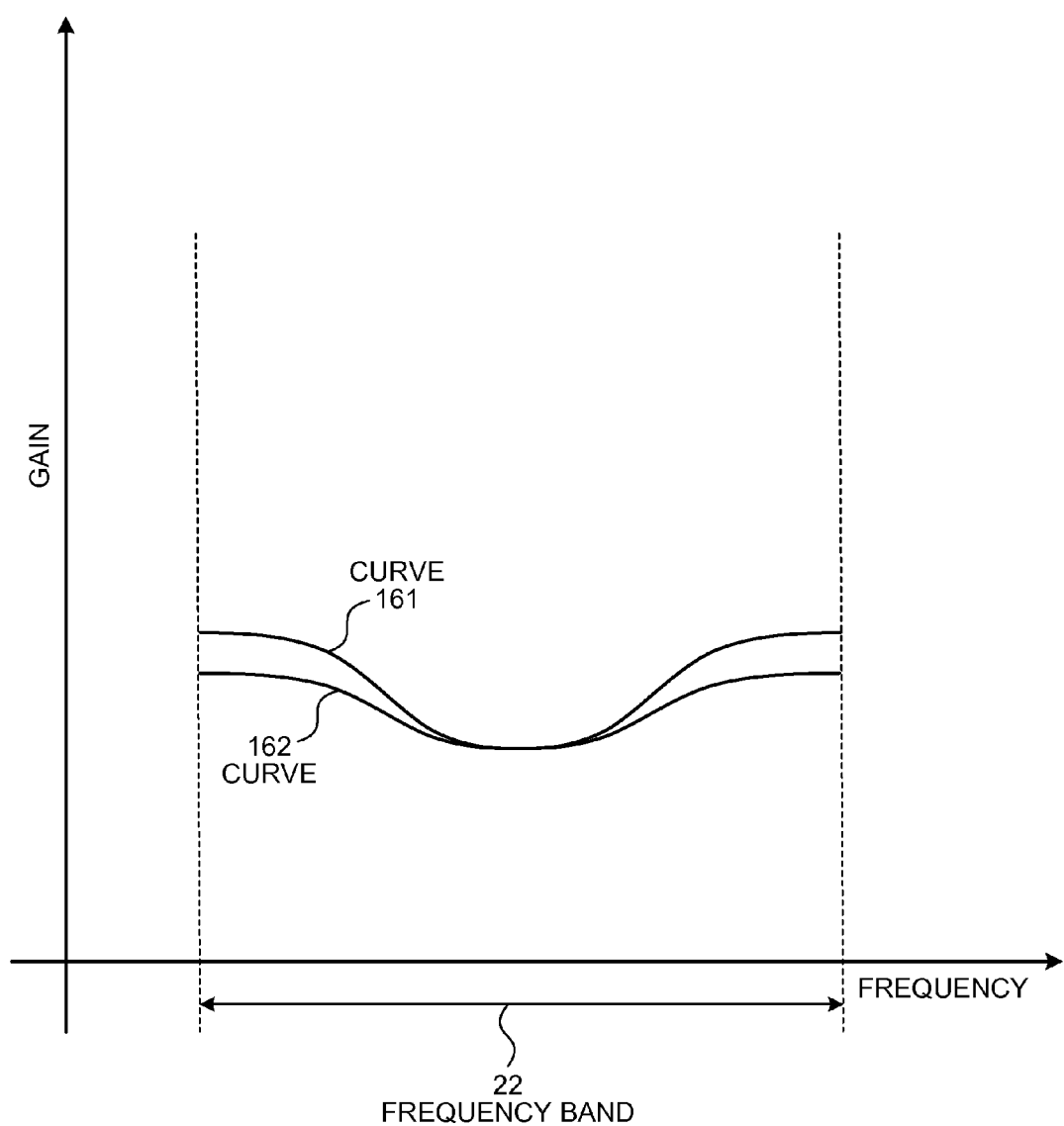

US 8,130,866 B2

PEAK SUPPRESSING APPARATUS, PEAK SUPPRESSING METHOD, AND WIRELESS COMMUNICATION DEVICE

CROSS-REFERENCE TO RELATED APPLICATION(S)

This application is based upon and claims the benefit of priority of the prior Japanese Patent Application No. 2008-164519, filed on Jun. 24, 2008, the entire contents of which are incorporated herein by reference.

FIELD

The embodiments discussed herein are directed to a peak suppressing apparatus, a peak suppressing method, and a wireless communication device for suppressing a peak component included in a transmission signal.

BACKGROUND

As represented by a base station in a mobile communication system, there is a wireless communication device that performs wireless communication with a plurality of remote stations. The wireless communication device amplifies a transmission signal by a power amplifier and transmits the signal. Conventionally, there has been known a signal processing technique referred to as peak suppression that enables to use the power amplifier near a saturated region having high power efficiency (for example, see Japanese Laid-open Patent Publication No. 2007-251909).

In the peak suppression, generally, a hard clipping process is performed to perform amplitude limiting on the transmission signal with a predetermined threshold, and out-of-band radiation power generated due to the hard clipping process is removed by a filter.

If a peak suppressing signal is extracted by subtracting the original transmission signal from the peak-suppressed transmission signal to analyze frequency components of the peak-suppressed signal, there is a tendency such that the peak suppressing signal appears in a larger value in a frequency exhibited in a central portion of a frequency band of the transmission signal, as compared to a frequency exhibited in an end portion thereof.

Although a peak suppressing process is required for efficient use of the power amplifier, after all, it means that a noise component is added to the transmission signal. In a multicarrier transmission system in which the frequency band of the transmission signal is divided into a plurality of frequency domains to perform communication, the quality of transmission signals differ from one carrier to another due to peak suppression. Specifically, the quality of a transmission signal in the frequency domain at the central portion of the frequency band is deteriorated as compared to the quality of a transmission signal in the frequency domain at the end of the frequency band.

However, when an orthogonal frequency division multiplexing (OFDM) system is applied to a mobile communication system, peak suppression for using the power amplifier in the saturated region having high power efficiency is essential, and equalization of the quality of the transmission signals in their respective frequency domains when the suppressing process is performed on the transmission signal becomes a task.

SUMMARY

According to an aspect of the invention, a peak suppressing apparatus includes an amplitude limiter that limits amplitude of the transmission signal with a predetermined threshold; a peak-suppressing-signal extracting unit that extracts a peak suppressing signal by subtracting the transmission signal before the amplitude limiting from the transmission signal amplitude-limited by the amplitude limiter; a filtering unit that performs filtering so that a frequency characteristic of the peak suppressing signal extracted by the peak-suppressing-signal extracting unit becomes flat; and an adder that adds the peak suppressing signal filtered by the filtering unit to the transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a block diagram of a configuration of a wireless communication device equipped with a peak suppressing apparatus according to a first embodiment of the present invention;

FIG. 2 schematically depicts a spectrum of a transmission signal;

FIG. 3 is a block diagram of a configuration of the peak suppressing apparatus according to the first embodiment;

FIG. 4A schematically depicts a spectrum of a peak suppressing signal;

FIG. 4B depicts a frequency characteristic of a filter unit;

FIG. 4C schematically depicts a spectrum of the peak suppressing signal having passed through the filter unit;

FIG. 7A schematically depicts a spectrum of a peak suppressing signal; and

FIG. 7B depicts a frequency characteristic of a filter unit.

DESCRIPTION OF EMBODIMENT(S)

Preferred embodiments of a peak suppressing apparatus, a peak suppressing method, and a wireless communication device of the present invention will be explained below in detail with reference to the accompanying drawings.

First Embodiment

Figure 1:
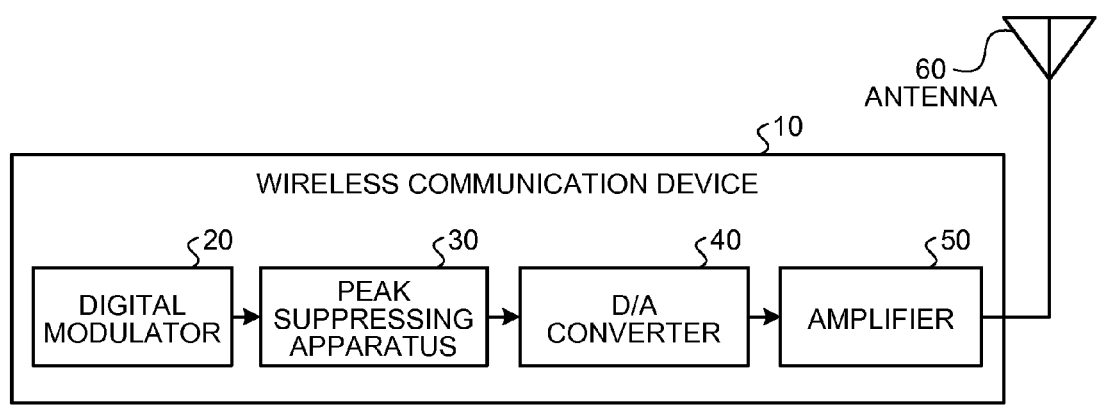

A configuration of a wireless communication device equipped with a peak suppressing apparatus according to a first embodiment of the present invention is explained with reference to FIG. 1. FIG. 1 is a block diagram of a configuration of the wireless communication device equipped with the peak suppressing apparatus according to the first embodiment. As depicted in FIG. 1, a wireless communication device 10 includes a digital modulator 20, a peak suppressing apparatus 30, a D/A converter 40, an amplifier 50, and an antenna 60. The wireless communication device 10 uses the OFDM as a communication system. The communication system applied to the wireless communication device 10 is not limited to the OFDM, and any communication system can be used so long as it is the multicarrier transmission system in which the frequency band of the transmission signal is divided into a plurality of frequency domains and allocated to remote stations, respectively.

Figure 2:
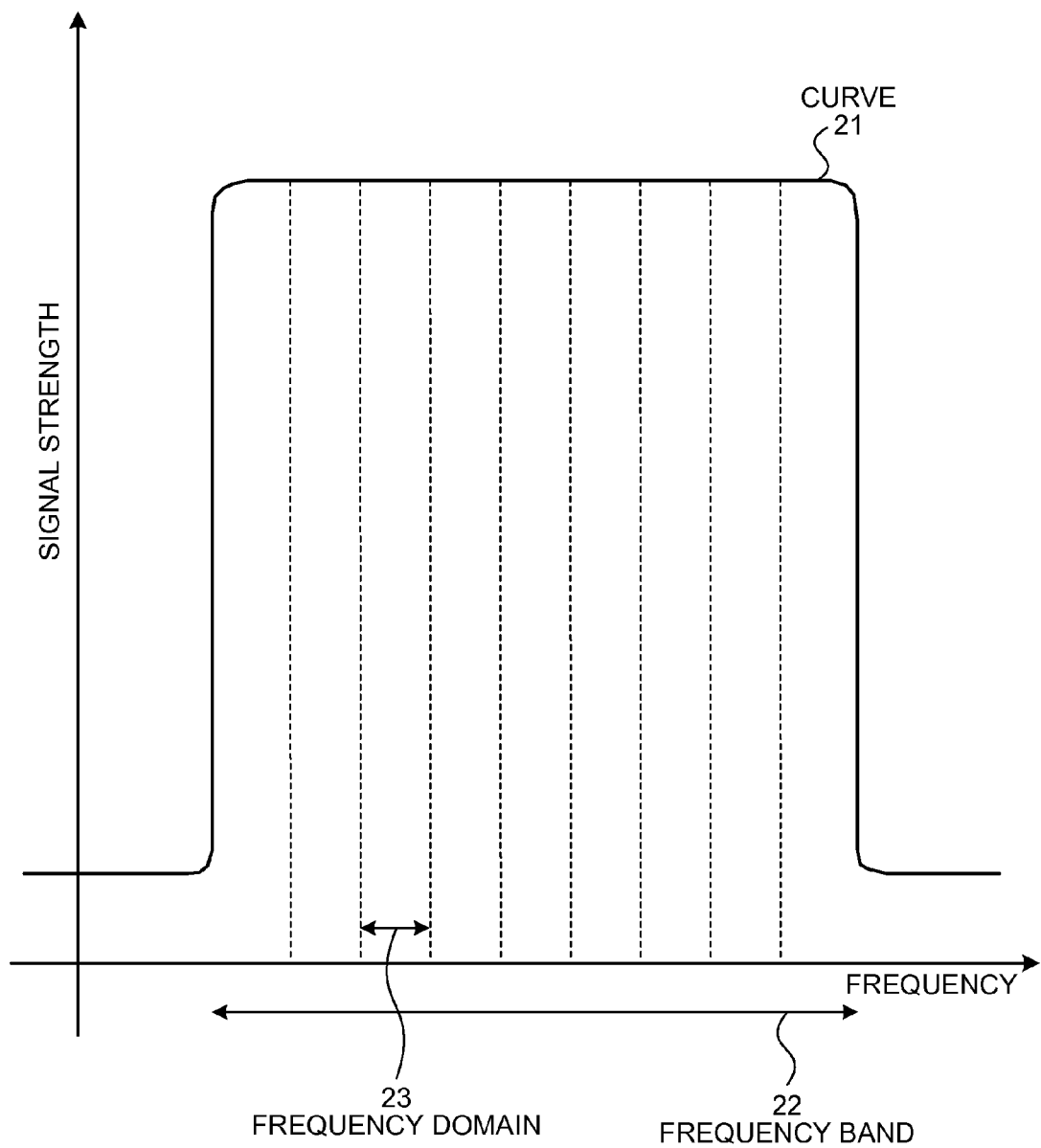

The digital modulator 20 performs a predetermined process to digital data to be transmitted to generate an OFDM transmission signal, such as serial-parallel conversion or inverse Fast Fourier transform, in addition to digital modulation such as binary phase shift keying (BPSK) or 16 quadrature amplitude modulation (16 QAM). The digital modulator 20 outputs the generated transmission signal to the peak suppressing apparatus 30. FIG. 2 schematically depicts a spectrum of the transmission signal. As depicted in FIG. 2, the spectrum of the transmission signal is expressed as a curve 21 on a graph in which frequency is plotted on the x-axis and signal strength is plotted on the y-axis. In the OFDM, a frequency domain 23 in a frequency band 22 is allocated to one remote station. There are plural frequency domains in the frequency band 22 other than the frequency domain 23, and each frequency domain is allocated to an individual remote station.

The peak suppressing apparatus 30 suppresses a peak component included in the transmission signal, and outputs the peak-suppressed transmission signal to the D/A converter 40. The D/A converter 40 converts the transmission signal from a digital signal to an analog signal, and outputs the converted transmission signal to the amplifier 50. The amplifier 50 amplifies the transmission signal and outputs the transmission signal to the antenna 60. The antenna 60 transmits the amplified carrier signal as radio waves.

The peak suppressing apparatus 30 is commonly installed as a processor that performs peak suppression for using the amplifier 50 in a saturated region having high power efficiency in the wireless communication device 10. A configuration of the peak suppressing apparatus 30 is specifically explained below. According to such a configuration, even when the frequency band of the transmission signal is divided into plural frequency domains and the divided frequency domains are allocated to the remote stations, respectively, the quality of transmission signals respectively transmitted to the allocated remote stations can be equalized.

Figure 3:
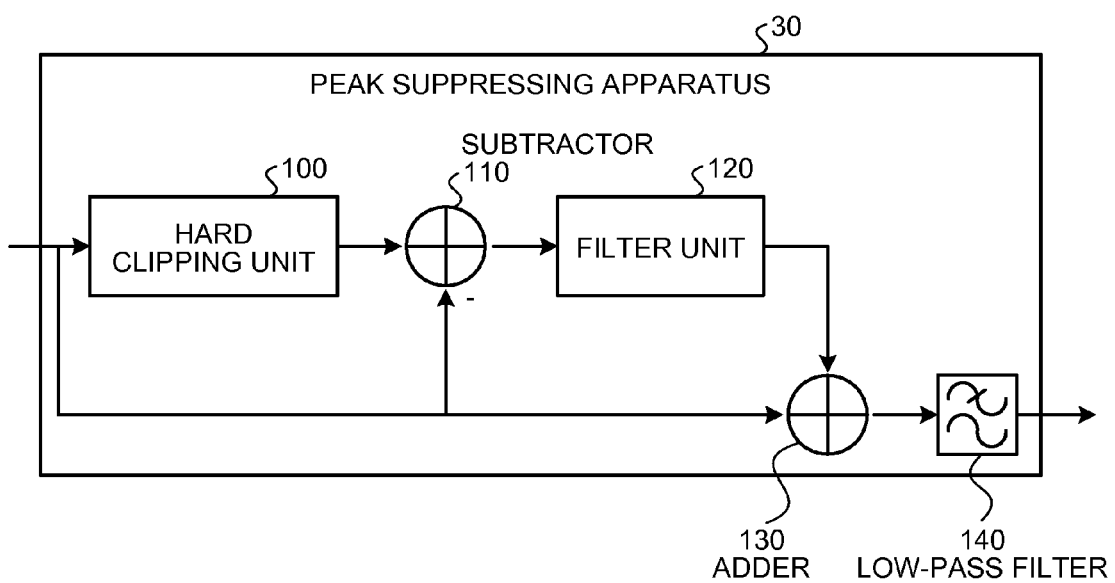

FIG. 3 is a block diagram of a configuration of the peak suppressing apparatus 30 according to the first embodiment. As depicted in FIG. 3, the peak suppressing apparatus 30 includes a hard clipping unit 100, a subtractor 110, a filter unit 120, an adder 130, and a low-pass filter 140.

The transmission signal output from the digital modulator 20 depicted in FIG. 1 is input to the hard clipping unit 100. Hereinafter the transmission signal is referred to as an original transmission signal. The original transmission signal is also input to the subtractor 110 and the adder 130 in addition to the hard clipping unit 100. The hard clipping unit 100 performs an existing hard clipping process such as amplitude limiting on the original transmission signal with a predetermined threshold and outputs the transmission signal to the subtractor 110. The threshold is fixed to a preset value.

Figure 4A:
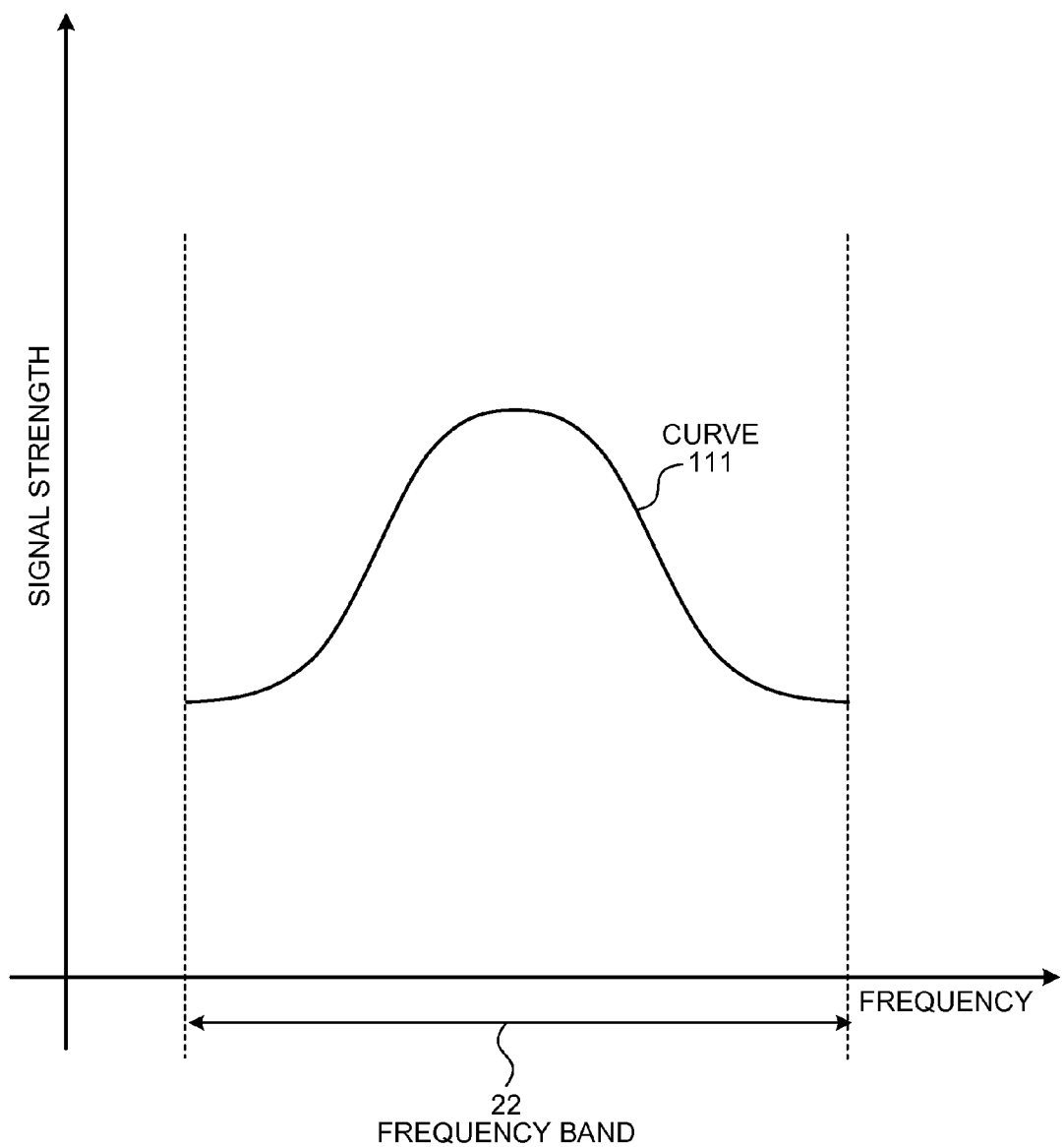

The subtractor 110 subtracts the original transmission signal from the transmission signal output from the hard clipping unit 100 to extract a peak suppressing signal. The subtractor 110 then outputs the peak suppressing signal to the filter unit 120. FIG. 4A schematically depicts a spectrum of the peak suppressing signal. As depicted in FIG. 4A, the spectrum of the peak suppressing signal is expressed as a curve 111 on a graph in which frequency is plotted on the x-axis and signal strength is plotted on the y-axis. As depicted by the curve 111, the signal strength becomes the largest at the center of the frequency band 22, and the value thereof decreases toward both ends thereof. The peak suppressing signal is a noise for the original transmission signal. In the peak suppressing signal having this spectrum, a remote station to which the frequency domain including the center of the frequency band 22 is allocated and a remote station to which the frequency domain including the end of the frequency band 22 is allocated differ in the quality of the transmission signal.

Therefore, the filter unit 120 performs filtering on the peak suppressing signal based on a predetermined frequency characteristic. FIG. 4B depicts the frequency characteristic of the filter unit 120. As depicted in FIG. 4B, the frequency characteristic of the filter unit 120 is expressed as a curve 121 on a graph in which frequency is plotted on the x-axis and gain is plotted on the y-axis. As depicted by the curve 121, it is desired that the gain becomes the smallest at the center of the frequency band 22 and the value thereof increases toward the both ends thereof, which corresponds to an inverse characteristic of the spectrum of the peak suppressing signal.

FIG. 4C schematically depicts a spectrum of the peak suppressing signal having passed through the filter unit 120. As depicted in FIG. 4C, when the peak suppressing signal passes through the filter unit 120, the spectrum of the peak suppressing signal changes from the curve 111 to a line 125 on the graph in which frequency is plotted on the x-axis and signal strength is plotted on the y-axis. According to the peak suppressing signal having this spectrum, the quality of the transmission signals can be equalized among the remote stations to which the frequency domains including the center of the frequency band 22 are allocated and the remote stations to which the frequency domains including the ends of the frequency band 22 are allocated.

The adder 130 adds the original transmission signal to the transmission signal input from the filter unit 120, and outputs a resultant signal to the low-pass filter 140. The low-pass filter 140 removes out-of-band radiation generated in the hard clipping unit 100 and the like from the transmission signal, and outputs the signal to the D/A converter 40 depicted in FIG. 1.

Figure 5:
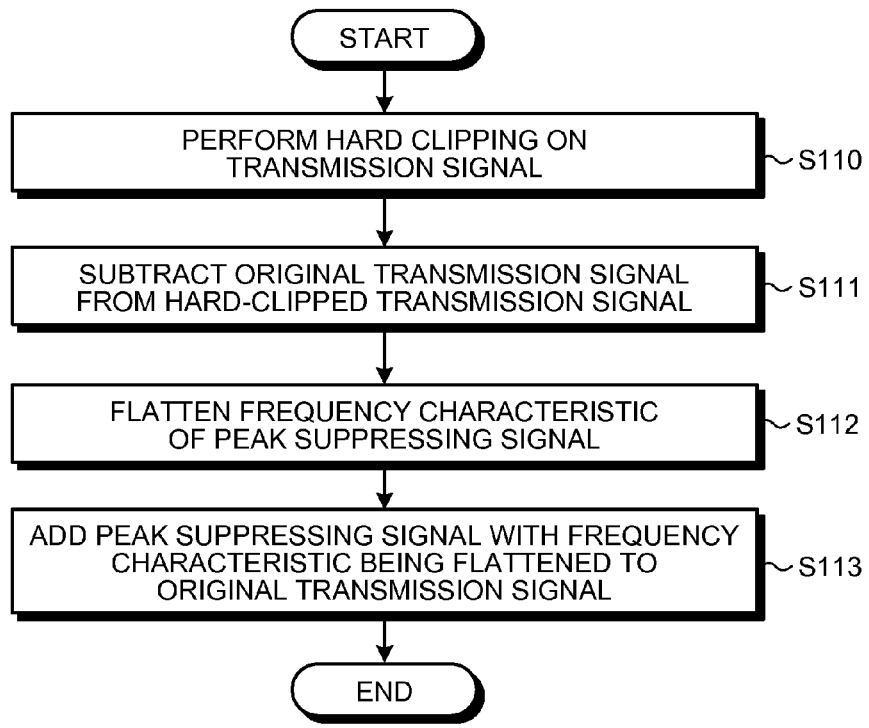
FIG. 5 is a flowchart of a process performed by a peak suppressing apparatus.

A flow of the process performed by the peak suppressing apparatus 30 is explained next with reference to FIG. 5. FIG. 5 is a flowchart of the process performed by the peak suppressing apparatus 30.

As depicted in FIG. 5, in the peak suppressing apparatus 30, the hard clipping unit 100 performs hard clipping on the transmission signal (Step S110). The subtractor 110 subtracts the original transmission signal from the transmission signal after the hard clipping (Step S111). The filter unit 120 flattens the frequency characteristic of the peak suppressing signal as a subtraction result (Step S112). The adder 130 adds the peak suppressing signal with the frequency characteristic being flattened to the original transmission signal (Step S113), to finish the process.

As described above, according to the first embodiment, the peak suppressing signal is extracted by subtracting the original transmission signal from the hard-clipped transmission signal, the extracted peak suppressing signal is filtered, and then the peak suppressing signal is added to the original transmission signal. Accordingly, the peak suppressing signal with the frequency characteristic being flattened is added to the original transmission signal, and thus, even when the frequency band of the transmission signal is divided into plural frequency domains and the divided frequency band are allocated to the remote stations, respectively, the quality of the transmission signals respectively transmitted to the allocated remote stations can be equalized.

In the first embodiment, it has been explained that the hard clipping unit performs the amplitude limiting with one fixed threshold. However, in a second embodiment of the present invention, a case that the threshold is variable is explained.

The spectrum of the peak suppressing signal to be extracted also changes by changing the threshold. Accordingly, the frequency characteristic of the filter unit needs to be changed corresponding to the respective thresholds, so that the spectrum of the peak suppressing signal is flattened at all times. In the explanations below, the same reference numerals are used to denote the same parts explained above, and detailed explanations thereof will be omitted.

Figure 6:
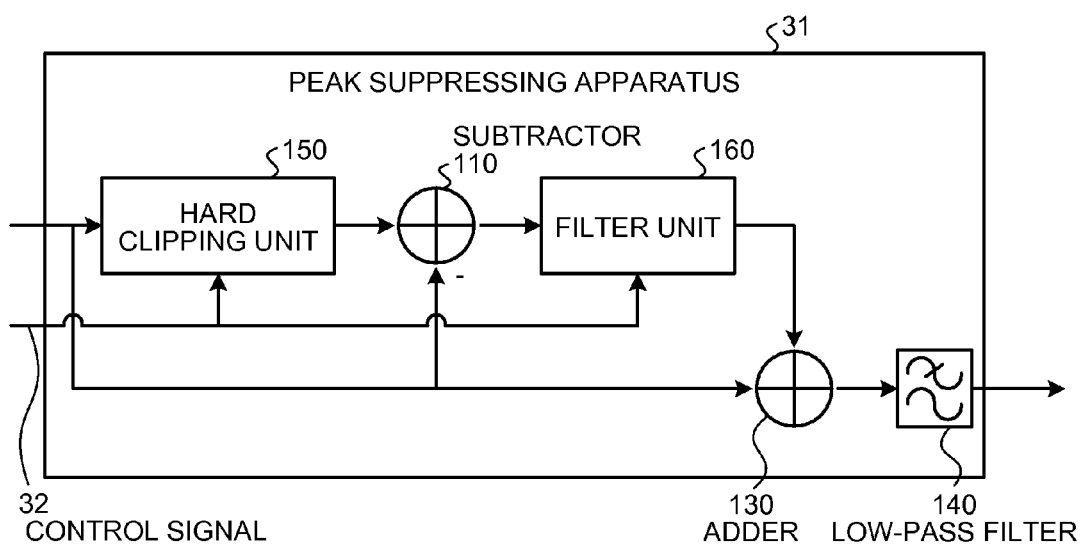
FIG. 6 is a block diagram of a configuration of a peak suppressing apparatus according to a second embodiment of the present invention.

FIG. 6 is a block diagram of a configuration of a peak suppressing apparatus according to the second embodiment. As depicted in FIG. 6, a peak suppressing apparatus 31 includes the subtractor 110, the adder 130, the low-pass filter 140, a hard clipping unit 150, and a filter unit 160.

A predetermined control signal 32 is input to the hard clipping unit 150, different from the first embodiment. The control signal 32 is input also to the filter unit 160 described later. Upon reception of the control signal 32, the hard clipping unit 150 changes the threshold corresponding to the control signal 32, and performs amplitude limiting with the changed threshold. For example, two thresholds are set in the hard clipping unit 150, and the hard clipping unit 150 alternately changes the threshold from a first one to a second one, and from the second one to the first one at every reception of the control signal 32. Three or more thresholds can be set. When three or more thresholds are set, the set thresholds can be changed over in a certain order, every time the control signal 32 is input to the hard clipping unit 150. Alternatively, the hard clipping unit 150 can change the threshold corresponding to the received unique control signal.

The subtractor 110 outputs a different peak suppressing signal according to the threshold that is used by the hard clipping unit 150 to perform the amplitude limiting. FIG. 7A schematically depicts spectra of the peak suppressing signal. As depicted in FIG. 7A, for example, the spectrum of the peak suppressing signal before the hard clipping unit 150 receives the control signal 32 is expressed as a curve 112 and the spectrum thereof after the hard clipping unit 150 receives the control signal 32 is expressed as a curve 113.

The filter unit 160 has a plurality of different frequency characteristics, different from the first embodiment, and performs filtering based on any one of the different frequency characteristics. The filter unit 160 receives the control signal 32 at the same timing as that of the hard clipping unit 150, and changes the frequency characteristic according to the received control signal 32. At this time, the hard clipping unit 150 also changes the threshold, and the peak suppressing signal having a different spectrum from the previous one is input to the filter unit 160. The filter unit 160 flattens the different spectrum of the peak suppressing signal from the previous one with the changed frequency characteristic. Three or more frequency characteristics can be set as in the hard clipping unit 150.

FIG. 7B depicts frequency characteristics of the filter unit 160. As depicted in FIG. 7B, for example, the frequency characteristic of the filter unit 160 before reception of the control signal 32 is expressed as a curve 161, and the frequency characteristic thereof after reception of the control signal 32 is expressed as a curve 162. The filter unit 160 having the frequency characteristic expressed by the curve 161 flattens the spectrum of the peak suppressing signal expressed by the curve 112, and the filter unit 160 having the frequency characteristic expressed by the curve 162 flattens the spectrum of the peak suppressing signal expressed by the curve 113.

According to the second embodiment, the peak suppression of the transmission signal can be controlled by making the amplitude limiting threshold variable, and the peak suppression can be made flexible to a change of the amplifier, as compared with a case that the threshold is fixed.

As described above, in the embodiments, the peak suppressing signal is extracted by subtracting the transmission signal before the amplitude limiting from the amplitude-limited transmission signal, the extracted peak suppressing signal is filtered, and then the filtered peak suppressing signal is added to the transmission signal before the amplitude limiting. Accordingly, the peak suppressing signal with the frequency characteristic being flattened is added to the transmission signal, and thus, even when the frequency band of the transmission signal is divided into plural frequency domains to transmit plural transmission signals, the quality of the transmission signals in their respective frequency domains can be equalized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A peak suppressing apparatus comprising:
   an amplitude limiter that limits amplitude of a transmission signal with a predetermined threshold;
   a peak-suppressing-signal extracting unit that extracts a peak suppressing signal by subtracting a first transmission signal whose amplitude has not been limited by the amplitude limiter from a second transmission signal whose amplitude has been limited by the amplitude limiter;
   a filtering unit that performs filtering so that a frequency characteristic of the peak suppressing signal extracted by the peak-suppressing-signal extracting unit becomes flat by using a filter whose frequency characteristic indicates gain that becomes smallest at a central portion of a frequency band and increases toward both ends of the frequency band, the frequency band including plural frequency domains each of which is allocated to an individual remote station; and
   an adder that adds the peak suppressing signal filtered by the filtering unit to the transmission signal.

2. The peak suppressing apparatus according to claim 1, wherein
   when having received a predetermined control signal, the amplitude limiter changes the threshold according to the control signal and performs the amplitude limiting with the changed threshold, and
   the filtering unit filters the peak suppressing signal based on any one of different frequency characteristics, and upon reception of the predetermined control signal, determines which frequency characteristic is to be used to perform the filtering.

3. A peak suppressing method comprising:
   limiting amplitude of a transmission signal with a predetermined threshold;
   extracting a peak suppressing signal by subtracting a first transmission signal whose amplitude has not been limited by the amplitude limiter from a second transmission signal whose amplitude has been limited in the limiting;

performing filtering so that a frequency characteristic of the peak suppressing signal extracted in the extracting becomes flat by using a filter whose frequency characteristic indicates gain that becomes smallest at a central portion of a frequency band and increases toward both ends of the frequency band, the frequency band including plural frequency domains each of which is allocated to an individual remote station; and adding the peak suppressing signal filtered in the performing of the filtering to the transmission signal.

4. The peak suppressing method according to claim 3, wherein in the limiting, when having received a predetermined control signal, the threshold is changed according to the control signal and the amplitude limiting is performed with the changed threshold, and in the performing of the filtering, the peak suppressing signal is filtered based on any one of different frequency characteristics, and upon reception of the predetermined control signal, which frequency characteristic is to be used to perform the filtering is determined.

5. A wireless communication device comprising a peak suppressing unit that suppresses a peak component of a transmission signal, before amplifying the transmission signal, wherein the peak suppressing unit comprises:

an amplitude limiter that limits amplitude of the transmission signal with a predetermined threshold;

a peak-suppressing-signal extracting unit that extracts a peak suppressing signal by subtracting a first transmission signal whose amplitude has not been limited by the amplitude limiter from a second transmission signal whose amplitude has been limited by the amplitude limiter;

a filtering unit that performs filtering so that a frequency characteristic of the peak suppressing signal extracted by the peak-suppressing-signal extracting unit becomes flat by using a filter whose frequency characteristic indicates gain that becomes smallest at a central portion of a frequency band and increases toward both ends of the frequency band, the frequency band including plural frequency domains each of which is allocated to an individual remote station; and an adder that adds the peak suppressing signal filtered by the filtering unit to the transmission signal.

\* \* \* \* \*